(12) United States Patent
Sharma

(10) Patent No.: US 9,998,453 B1
(45) Date of Patent: Jun. 12, 2018

(54) CONTROLLING ACCESS TO PERSONAL DATA

(71) Applicant: Amazon Technologies, Inc., Seattle, WA (US)

(72) Inventor: Anurag Sharma, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days. days.

(21) Appl. No.: 15/179,902

(22) Filed: Jun. 10, 2016

(51) Int. Cl.
*H04L 29/06* (2006.01)
*G06F 17/30* (2006.01)
*G06F 3/0481* (2013.01)

(52) U.S. Cl.
CPC .......... *H04L 63/083* (2013.01); *G06F 3/0481* (2013.01); *G06F 17/30867* (2013.01)

(58) Field of Classification Search
CPC . H04L 63/083; G06F 3/0481; G06F 17/30867
USPC .................................................. 100/1; 726/7
See application file for complete search history.

(56) References Cited

U.S. PATENT DOCUMENTS

| | | | |
|---|---|---|---|
| 2003/0088520 A1* | 5/2003 | Bohrer | G06Q 10/10 705/74 |
| 2011/0283335 A1* | 11/2011 | Bussard | G06F 17/30684 726/1 |
| 2012/0005211 A1* | 1/2012 | Ayoub | G06F 17/3089 707/737 |
| 2016/0065563 A1* | 3/2016 | Broadbent | H04L 63/0281 726/9 |

* cited by examiner

*Primary Examiner* — Brian F Shaw
*Assistant Examiner* — William B Jones
(74) *Attorney, Agent, or Firm* — Thomas | Horstemeyer, LLP

(57) ABSTRACT

Disclosed are various embodiments for controlling access to personal data of a user. In one embodiment, content is requested from a network site using an authentication token. It is determined that the content includes a placeholder for personal data. The personal data is received from a personal data service, where the service is configured to limit access to the personal data to a client authorized by the user who owns the personal data. The content is modified to replace the placeholder with the personal data, and the content is then rendered for presentation.

20 Claims, 8 Drawing Sheets

CONTROLLING ACCESS TO PERSONAL DATA

BACKGROUND

Federated identity providers conveniently allow for users to log in with numerous network sites using a single account and a single set of security credentials. For instance, an operator of a social network may also be a federated identity provider, and users may be able to use their social network username and password in order to access resources of a third-party network site that supports the federated identity provider. In addition to sharing an authentication platform with third parties, federated identity providers may also support automated sharing of users' personal data with the third parties so that the users do not have to supply the data manually.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
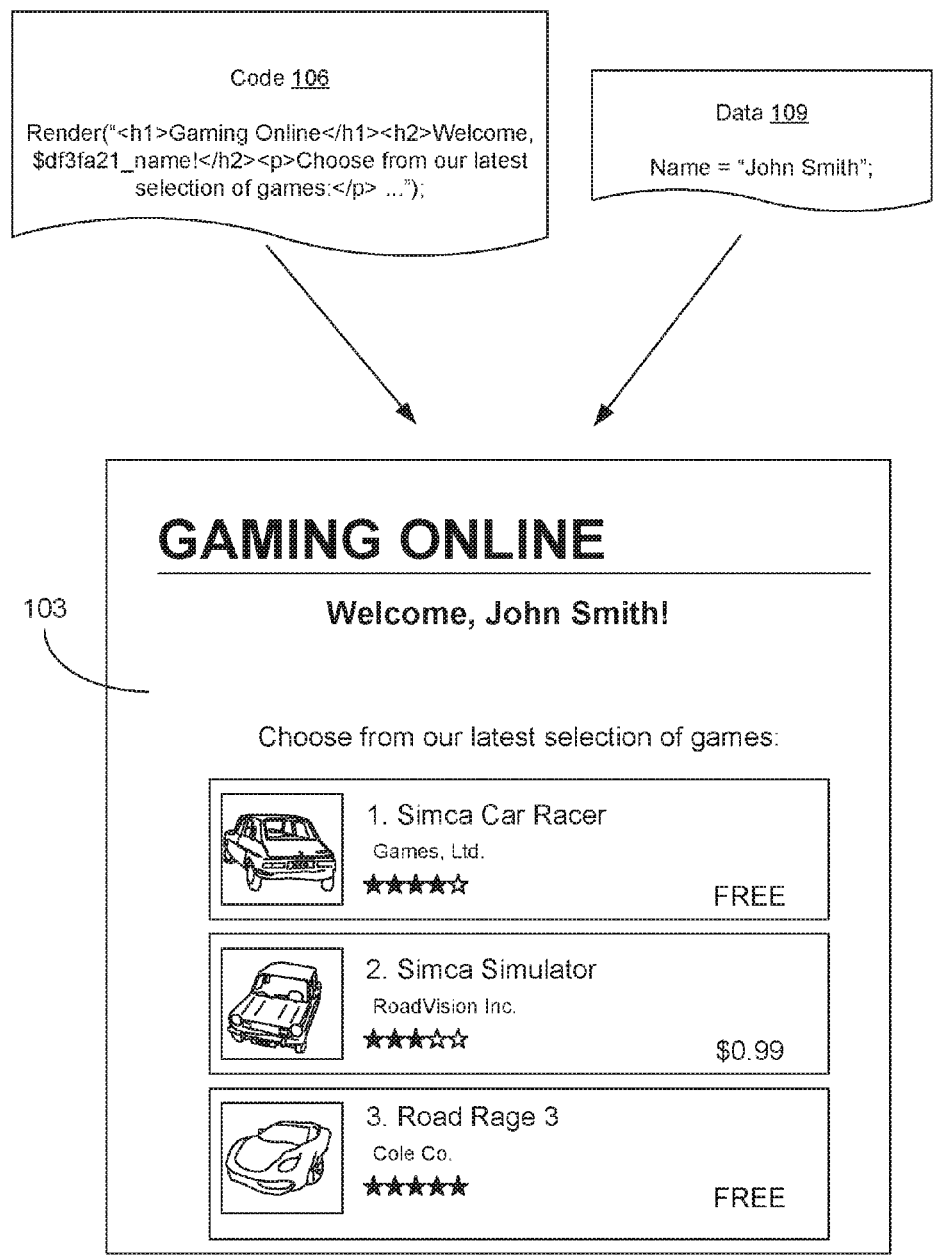
FIG. 1 is a drawing of an example scenario involving controlled access to personal data according to various embodiments of the present disclosure.

The present disclosure relates to protecting personal data by rendering the personal data in user interfaces in a user-controlled manner and managing sharing of personal data. Federated identity providers can make it simple to share personal data with third parties. When a user relies upon a federated identity provider to authenticate to a third-party network site, the user may be deemed to trust the third-party network site. Thus, in some scenarios, some or all of the user's personal data that is available to the federated identity provider may then be automatically shared with the third-party network site. This allows the user conveniently to avoid having to create a separate account with the third-party network site and provide all of the personal data manually.

Although convenient, sharing personal data with a third-party network site may not be a good idea. Once the third-party network site has the personal data, the user loses control over it. Over time, ownership of the third-party network site may change, and the user's personal data may be used in ways that the user would disapprove. For example, sharing a user's full name and email address with a third-party network site offering online games may seem innocuous at first. However, the owner of the site may use that information for future marketing purposes, or in some cases, the site may become compromised, and the user's name and email address may be published for all to see. Also, users may not be aware of the full extent of the types of personal data that are being shared with the third party by the federated identity provider.

Moreover, sharing personal data with the third-party network site may not be absolutely necessary. A user's name may be shared with third-party network sites simply to customize user interfaces. To illustrate, a home page may be customized to welcome a user by his or her first name. The third party operating the network site may not have a use for the name beyond this customization aspect. Further, through sharing of personal data, the third party may also be granted access to additional personal data of the user (e.g., email address, birthdate, home address, and/or other private information) by default when the third party has no need for this information or does not normally request this information.

Various embodiments of the present disclosure introduce a user-controlled rendering approach in order to limit undesired sharing of personal data. Given that a frequent use of personal data is to customize user interfaces, the user interfaces may be customized locally by a client device or by a proxy device rather than by the third-party network site server. In various embodiments, the third-party network server may generate network pages or other user interfaces that incorporate placeholders for personal data. The client or proxy may then obtain the user's personal data from a user-controlled repository and insert the personal data or a transformation thereof into the user interfaces. In some scenarios, sharing of certain types of personal data with third parties may be necessary but can be approved and monitored by the user. Ultimately, the variety of personal data that is shared as well as the number of third-party recipients can be greatly limited, thereby protecting user privacy.

Referring now to FIG. 1, shown is a drawing of an example scenario 100 according to an embodiment of the present disclosure. In the example scenario 100, a user interface 103 is rendered by a browser application based upon code 106 and data 109. The user interface 103 corresponds to a network page rendered from network content. In this non-limiting example, the browser application obtains the code 106 from a network site. According to principles of the present disclosure, the user has not elected to share certain personal data with the network site. Yet, the network content of the network site is configured to rely on certain personal information that typically would be provided by the user or automatically shared with the network site by a federated identity provider.

Here, the code 106 to generate the user interface 103 contains a placeholder ("$df3fa21_name") in place of the user's actual name, "John Smith." The browser obtains the actual name value from a personal data service as the data 109, which defines a parameter "Name" to be "John Smith." Per this mapping, the browser changes the placeholder to be the personal data from the data 109. Upon rendering, the user interface 103 includes a personal greeting ("Welcome, John Smith!") though the network site associated with the code 106 does not have access to the personal data. Consequently, the personal data remains under control of the user and the network site does not necessarily have access to the personal data when such access is not required. In the following discussion, a general description of the system and its components is provided, followed by a discussion of the operation of the same.

Figure 2A:
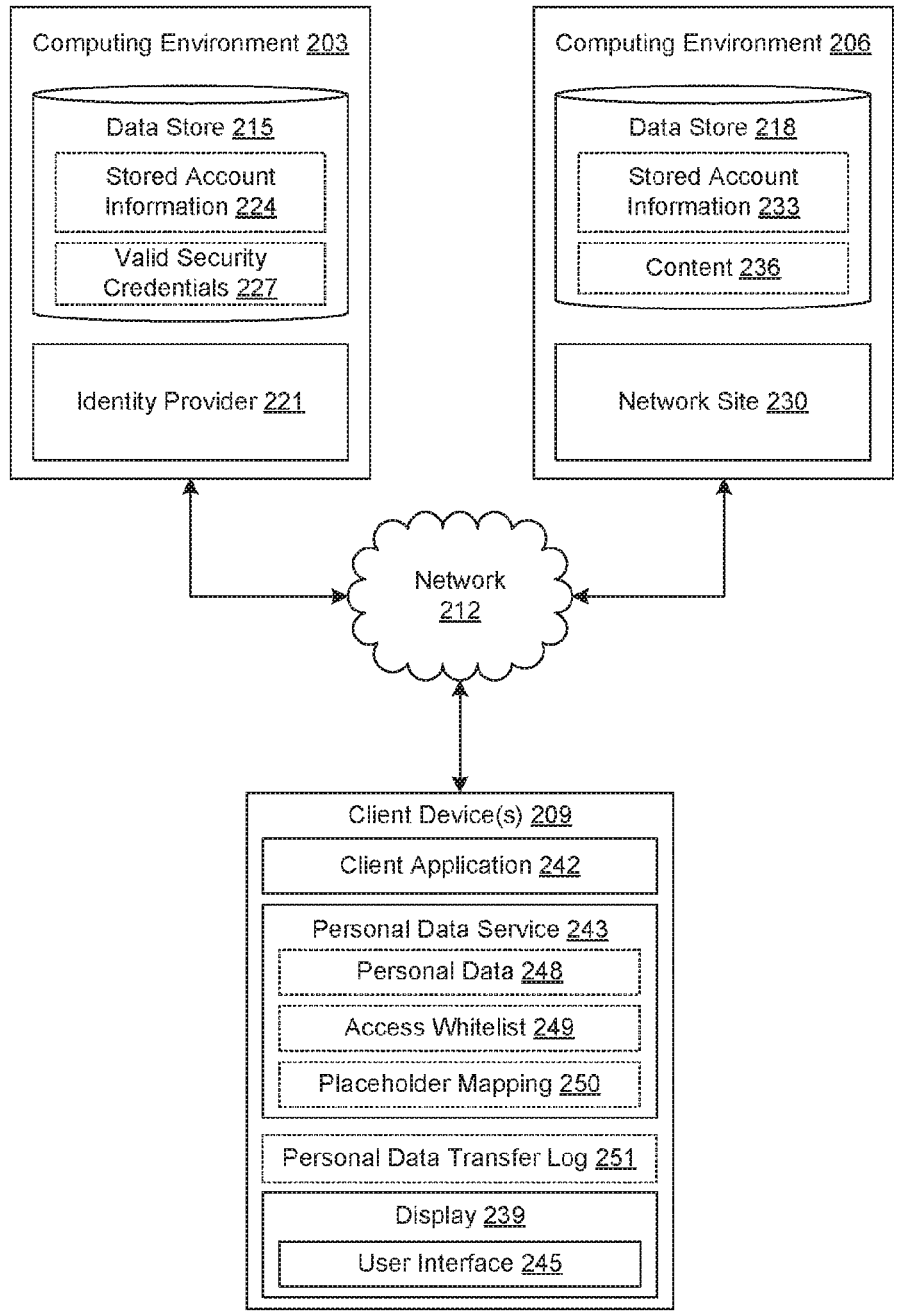
FIGS. 2A-2C are schematic block diagrams of networked environments according to various embodiments of the present disclosure.

With reference to FIG. 2A, shown is a networked environment 200 according to various embodiments. The networked environment 200 includes a computing environment 203, a computing environment 206, and a client device 209, which are in data communication with each other via a network 212. The network 212 includes, for example, the Internet, intranets, extranets, wide area networks (WANs), local area networks (LANs), wired networks, wireless networks, cable networks, satellite networks, or other suitable networks, etc., or any combination of two or more such networks.

The computing environments 203, 206 may comprise, for example, a server computer or any other system providing computing capability. Alternatively, the computing environments 203, 206 may employ a plurality of computing devices that may be arranged, for example, in one or more server banks or computer banks or other arrangements. Such computing devices may be located in a single installation or may be distributed among many different geographical locations. For example, the computing environments 203, 206 may include a plurality of computing devices that together may comprise a hosted computing resource, a grid computing resource, and/or any other distributed computing arrangement. In some cases, the computing environments 203, 206 may correspond to an elastic computing resource where the allotted capacity of processing, network, storage, or other computing-related resources may vary over time.

Various applications and/or other functionality may be executed in the computing environments 203, 206 according to various embodiments. Also, various data is stored in a respective data store 215, 218 that is accessible to the corresponding computing environment 203 or 206. The data stores 215, 218 may be representative of a plurality of data stores 215, 218 as can be appreciated. The data stored in the data stores 215, 218, for example, is associated with the operation of the various applications and/or functional entities described below.

The components executed on the computing environment 203, for example, include an identity provider 221 and other applications, services, processes, systems, engines, or functionality not discussed in detail herein. The identity provider 221 is executed to receive security credentials from client devices 209 as part of a sign-in process, validate the security credentials, and assuming valid credentials, issue authentication tokens to the client devices 209 and/or the relying party computing environments 206. In various embodiments, the identity provider 221 may support OpenID, security assertion markup language (SAML), OAuth, and/or other authentication technologies. Where the relying party computing environments 206 are operated by one or more different entities than the identity provider 221, the identity provider 221 may be considered to be a federated identity provider.

The data stored in the data store 215 includes, for example, stored account information 224, valid security credentials 227, and potentially other data. The stored account information 224 may include data associated with user accounts at the identity provider 221 level. This may include personal information such as name, address, email address, telephone number, and so on. This may also include account-related data such as a username. The valid security credentials 227 include data used to validate security credentials provided to the identity provider 221. To this end, the valid security credentials 227 may include hashed passwords, encrypted passwords, private keys, answers to knowledge-based questions, numerical codes, and other data.

The components executed on the computing environment 206, for example, include a network site 230 and other applications, services, processes, systems, engines, or functionality not discussed in detail herein. The network site 230 is executed to generate and serve up network pages or other forms of network content for rendering by client devices 209. To this end, the network site 230, as described, may include a hypertext transfer protocol (HTTP) server, commercially available examples of which include MICROSOFT Internet Information Services (IIS), APACHE HTTP Server, APACHE TOMCAT, and so on. In particular, the network site 230 may be a third party relative to the identity provider 221 and may participate in identity federation as facilitated by the identity provider 221. In this regard, users may not be required to establish separate accounts with the network site 230 but may instead use a single sign-on supported by the identity provider 221. However, it is noted that the identity provider 221 and the network site 230 may be operated by the same entity in some cases.

The data stored in the data store 218 includes, for example, stored account information 233, content 236, and potentially other data. The stored account information 233 for the network site 230 may include data associated with accounts at the network site 230 level. In particular, the stored account information 233 may include personal information such as name, address, email address, telephone number, and so on. This may include personal data that the user has elected to share with the network site 230 according to the embodiments described herein. The content 236 may include hypertext markup language (HTML), extensible markup language (XML), JAVASCRIPT, code, text, images, video, audio, and/or other forms of content. Some or all of the content 236 may be made available to client devices 209 only after the client devices 209 are authenticated. In some cases, the content 236 may correspond to audible content rather than visual content.

The client device 209 is representative of a plurality of client devices that may be coupled to the network 212. The client device 209 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, networked audio speakers, smartwatches, head mounted displays, or other devices. The client device 209 may include a display 239. The display 239 may comprise, for example, one or more devices such as liquid crystal display (LCD) displays, gas plasma-based flat panel displays, organic light emitting diode (OLED) displays, electrophoretic ink (E ink) displays, LCD projectors, or other types of display devices, etc. In some embodiments, the client device 209 may lack a display 239, e.g., in the case of a networked audio speaker.

The client device 209 may be configured to execute various applications such as a client application 242, a personal data service 243, and/or other applications. The client application 242 may be executed in a client device 209, for example, to access network content served up by the computing environment 206 and/or other servers, thereby rendering a user interface 245 on the display 239. To this end, the client application 242 may comprise, for example, a browser, a dedicated application, etc., and the user interface 245 may comprise a network page, an application screen, etc.

The personal data service 243 is executed to provide controlled access to personal data 248 owned by a user. Specifically, the personal data service 243 limits access to the personal data 248 to clients authorized by the user who owns the personal data 248. The personal data 248 may comprise the user's name, address, birthdate, Social Security number, email address, answers to knowledge-based questions, purchase history, browsing history, and/or any other data personal to the user for which the user may wish to control access for privacy reasons. Rather than providing third parties that participate in identity federation unfettered access to the personal data 248, the personal data service 243 may allow access only to applications and devices controlled by the user.

To this end, the personal data service 243 may have an access whitelist 249 that identifies network addresses, applications, accounts, network sites, network pages, etc., that are to be granted access to the personal data 248. In some cases, access to the personal data 248 may be controlled on a per-data item basis. Some embodiments of the personal data service 243 may be associated with an access blacklist indicating applications, devices, etc., that are explicitly not to be granted access to the personal data 248. In various embodiments, the personal data service 243 may be configured to provide access to the personal data 248 only to applications executed on the same client device 209 or only to client devices 209 on the same local network (or on the same virtual private network) as the personal data service 243.

In some implementations, the personal data service 243 may be configured to support localization. For example, the personal data service 243 may receive a specific locale in a request and then provide personal data 248 in response that has been localized for the specific locale. To illustrate, the personal data service 243 in some locales may provide birthdates with a day of the month first followed by the month, while in other locales the personal data service 243 may provide birthdates with the month first followed by the day of the month.

The personal data service 243 may facilitate user changes to personal data 248 from time to time. To this end, the personal data service 243, potentially in concert with the client application 242, may cause form-based user interfaces 245 to be presented that allow the user to add, modify, or delete personal data 248 as desired. For example, a user may move and may need to update his or her mailing address.

A placeholder mapping 250 may associate placeholders from content 236 with items of the personal data 248. In some situations, a user may grant exceptions and/or access to data items in the personal data 248 on a case-by-case basis. When personal data 248 is transferred to a third party upon consent of the user, facts relating to the transfer (e.g., time, destination network address, types of data requested, etc.) may be recorded in the personal data transfer log 251 for auditing and security purposes. This record may be maintained by the personal data service 243 and/or a client application 242 through which user consent was obtained.

As will be described, the client application 242 functions in concert with the personal data service 243 in order to limit access to the personal data 248. Specifically, when the personal data 248 is needed only for use within a user interface 245, the client application 242 may be configured to replace placeholders in the network content with items of personal data 248 retrieved from the personal data service 243. Further, the client application 242 may facilitate obtaining user consent to transfer items of personal data 248 to network sites 230 when specifically requested. Where items of personal data 248 are not available to or not stored by the personal data service 243, the client application 242 may render user interfaces 245 that facilitate obtaining the data items from the user. Also, the client application 242 may be configured to prevent code provided by a network site 230 from reporting personal data 248 back to the network site 230 in an unauthorized way. The client device 209 may be configured to execute applications beyond the client application 242 and the personal data service 243 such as, for example, email applications, social networking applications, word processors, spreadsheets, and/or other applications.

Figure 2B:
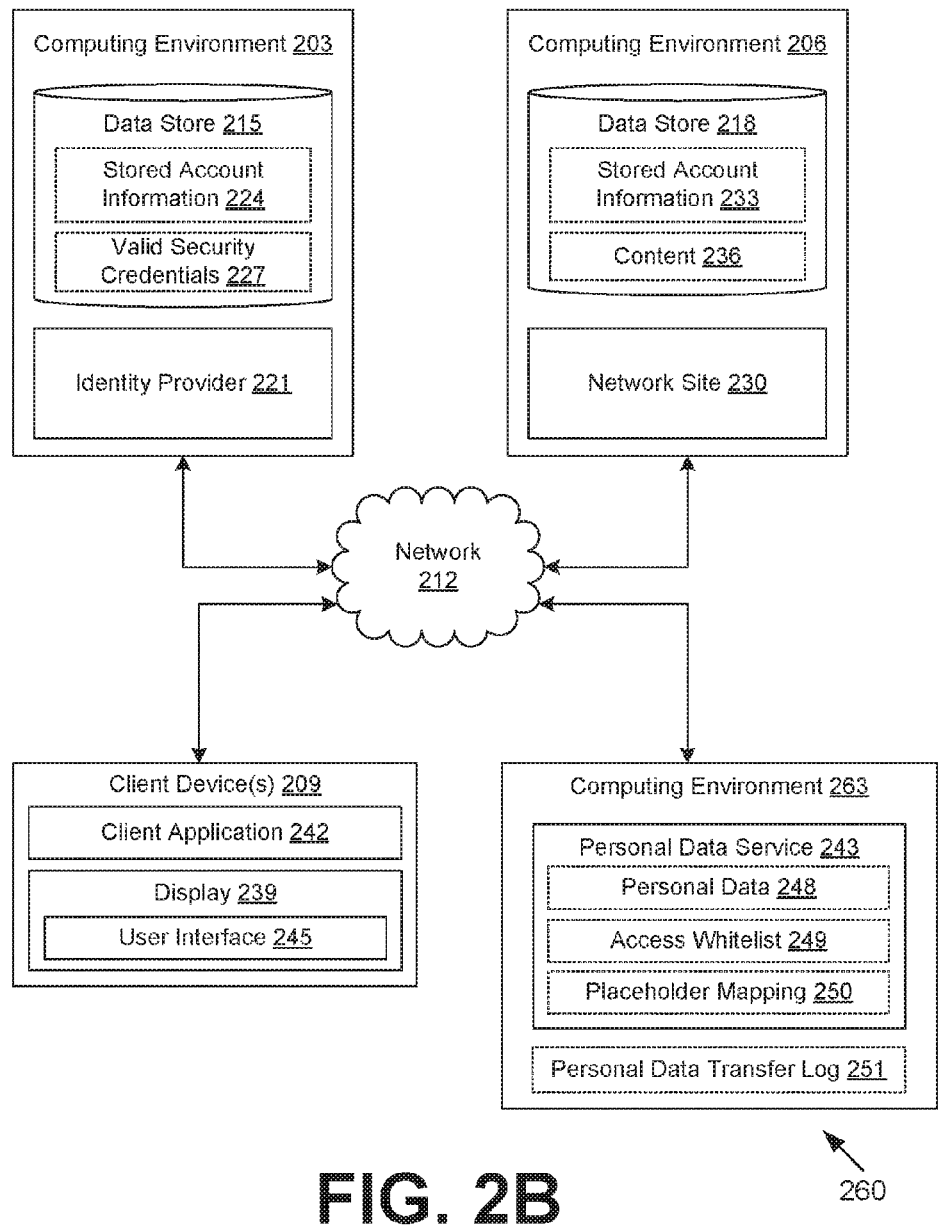

Turning now to FIG. 2B, shown is a networked environment 260 according to other embodiments. The networked environment 260 includes elements of the networked environment 200 (FIG. 2A), with the addition of the computing environment 263 in data communication via the network 212. The computing environment 263 may be similar in type to the computing environments 203 or 206.

The computing environment 263 in this example illustrates that the functionality of the personal data service 243 and the associated data need not be present on the same client device 209 as the client application 242. In fact, the personal data service 243 may be on a server computing device or some other device. While the personal data service 243 is under control of the user, the personal data service 243 may be executed on a shared server or provide similar services to other users, with the understanding that the personal data service 243 is administered on a per-user basis to maintain privacy of personal data 248.

Figure 2C:
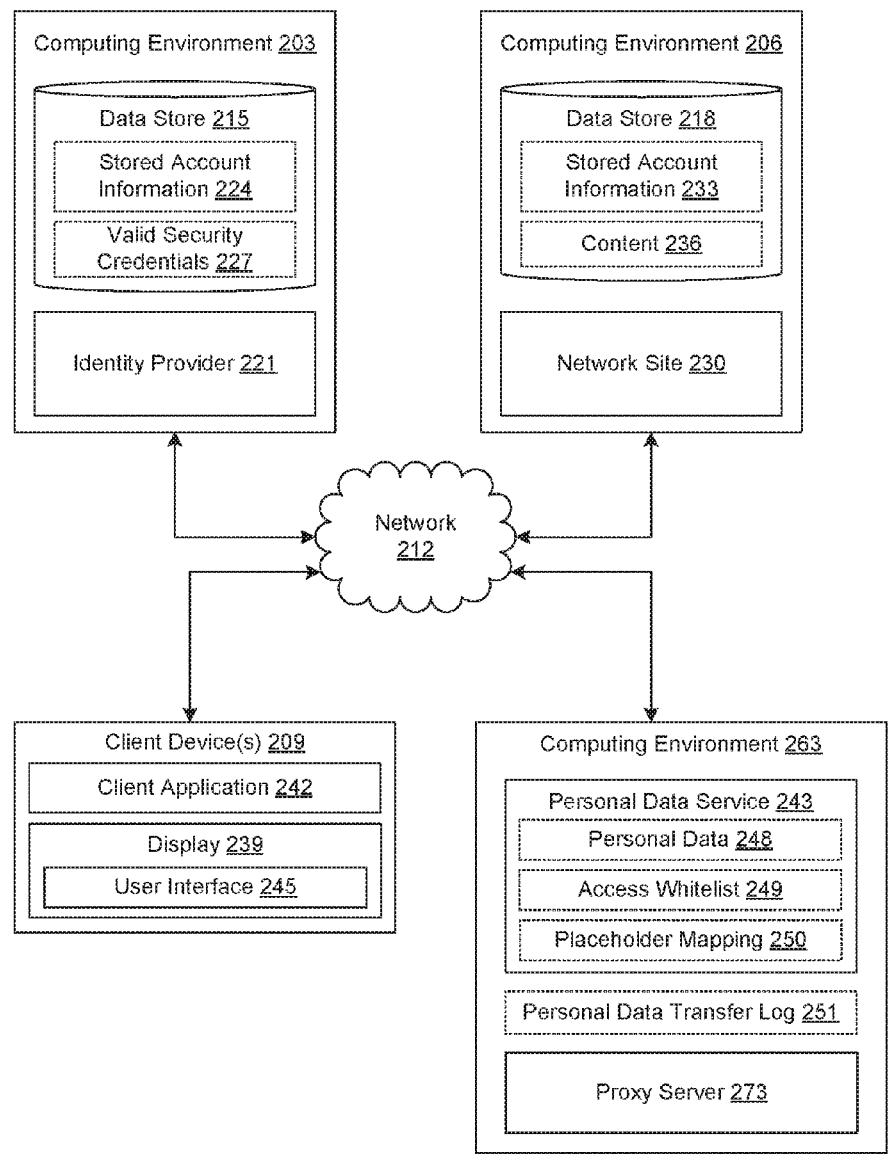

Moving on to FIG. 2C, shown is a networked environment 270 according to other embodiments. The networked environment 270 includes elements of the networked environment 260 (FIG. 2B), with the addition of the proxy server 273 executed in the computing environment 263. In this example, functions previously attributed to the client device 209 and the client application 242 may be transferred to a proxy server 273.

The proxy server 273 may be interposed between the client device 209 and the network site 230 such that requests for content by the client device 209 from the network site 230 may be routed to the proxy server 273. The proxy server 273 may request the content from the network site 230 on behalf of the client device 209 and then return the requested data back to the client device 209 when it is available. In this regard, the proxy server 273 may perform server-side processing of the content so as to replace placeholders with items of personal data 248 obtained from the personal data service 243, which may or may not be executed by the same computing environment 263.

Figure 3:
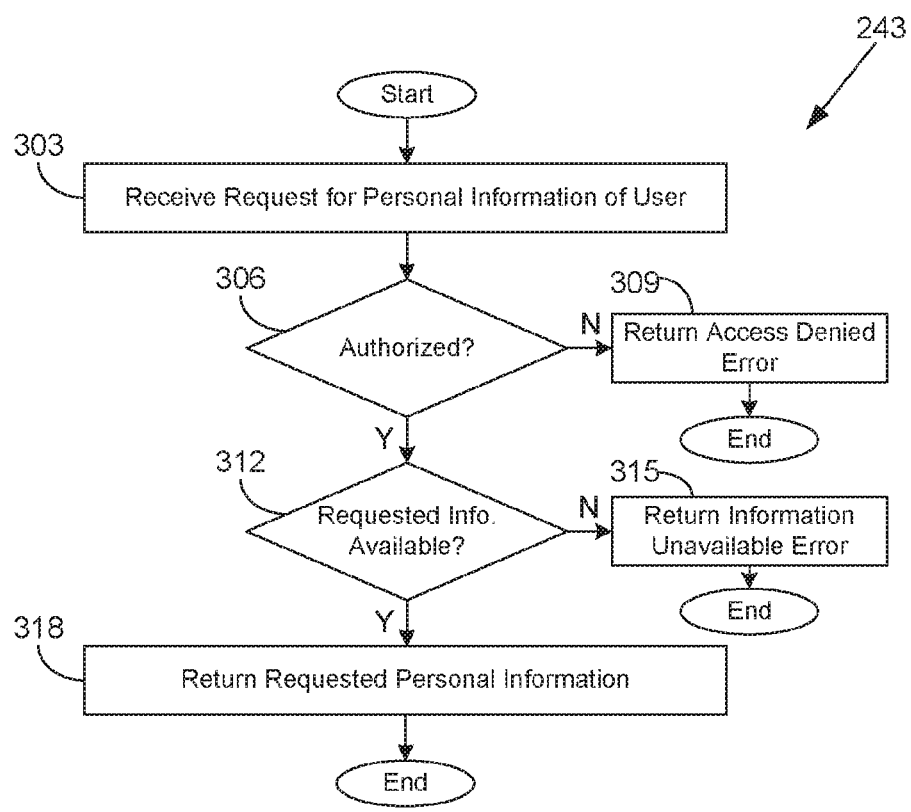
FIG. 3 is a flowchart illustrating one example of functionality implemented as portions of a personal data service executed in a computing environment in the networked environment of FIGS. 2A-2C according to various embodiments of the present disclosure.

Referring next to FIG. 3, shown is a flowchart that provides one example of the operation of a portion of the personal data service 243 according to various embodiments. It is understood that the flowchart of FIG. 3 provides merely an example of the many different types of functional arrangements that may be employed to implement the operation of the portion of the personal data service 243 as described herein. As an alternative, the flowchart of FIG. 3 may be viewed as depicting an example of elements of a method implemented in the client device 209 (FIG. 2A) or the computing environment 263 (FIGS. 2B & 2C) according to one or more embodiments.

Beginning with box 303, the personal data service 243 receives a request for personal information of a user. For example, the request may specify one or more types of personal information (e.g., name, email address, telephone number, etc.) that are requested. To this end, the request may include one or more placeholders from content 236 (FIG. 2A) that may be mapped to personal data 248 (FIG. 2A). The request may originate from a client application 242 (FIG. 2A). Alternatively, the request may originate from a network site 230 (FIG. 2A) in one embodiment. The request may include an identifier of a network page that is requesting to use the information.

In box 306, the personal data service 243 determines whether the request is authorized. For example, authorization may be determined with respect to an originating application identifier, a network address, or a password, key, token, or other security credential. In one embodiment, the personal data service 243 may compare the originating network address and/or the originating application identifier to an access whitelist 249 (FIG. 2A). If the originating network address and the originating application identifier are in the access whitelist 249, the request is authorized. If the originating network address and/or the originating application identifier are not in the access whitelist 249, the request is unauthorized.

In some embodiments, the personal data service 243 may support parental control rules that would prohibit sharing of some or all types of personal data 248 with network sites 230 when child users are present or authenticated. For example, a parental control rule may prevent a home address to be shared with a network site 230 if a child user is currently authenticated. The concept of parental controls may be extended to guest users or other users who are to have limited access, either to local usage of the personal data 248 or in sharing the personal data 248 with network sites 230.

Where the request originates from a third-party network site 230, the personal data service 243 may determine whether that third-party network site 230 is explicitly allowed access to the requested data by the user. In some cases, authorization may depend on the identity of the network page(s) that use the personal information. If the request is unauthorized, the personal data service 243 moves to box 309 and returns an access denied error. Thereafter, the operation of the portion of the personal data service 243 ends.

If the request is authorized, the personal data service 243 instead transitions to box 312 and determines whether the requested information is available in the personal data 248 stored and managed by the personal data service 243. In some scenarios, the requested data may never have been provided by the user to the personal data service 243 and therefore may be unavailable. If the requested information is unavailable, the personal data service 243 moves to box 315 and returns an information unavailable error. Alternatively, the personal data service 243 can cause a user interface (e.g., a pop-up window) to be rendered on the display 239 of the client device 209 in order to obtain the information from the user. Thereafter, the operation of the portion of the personal data service 243 ends.

If the requested information is available, the personal data service 243 moves from box 312 to box 318 and returns the requested information from the personal data 248 to the application or device that requested the information. Thereafter, the portion of the personal data service 243 ends.

Figure 4A:
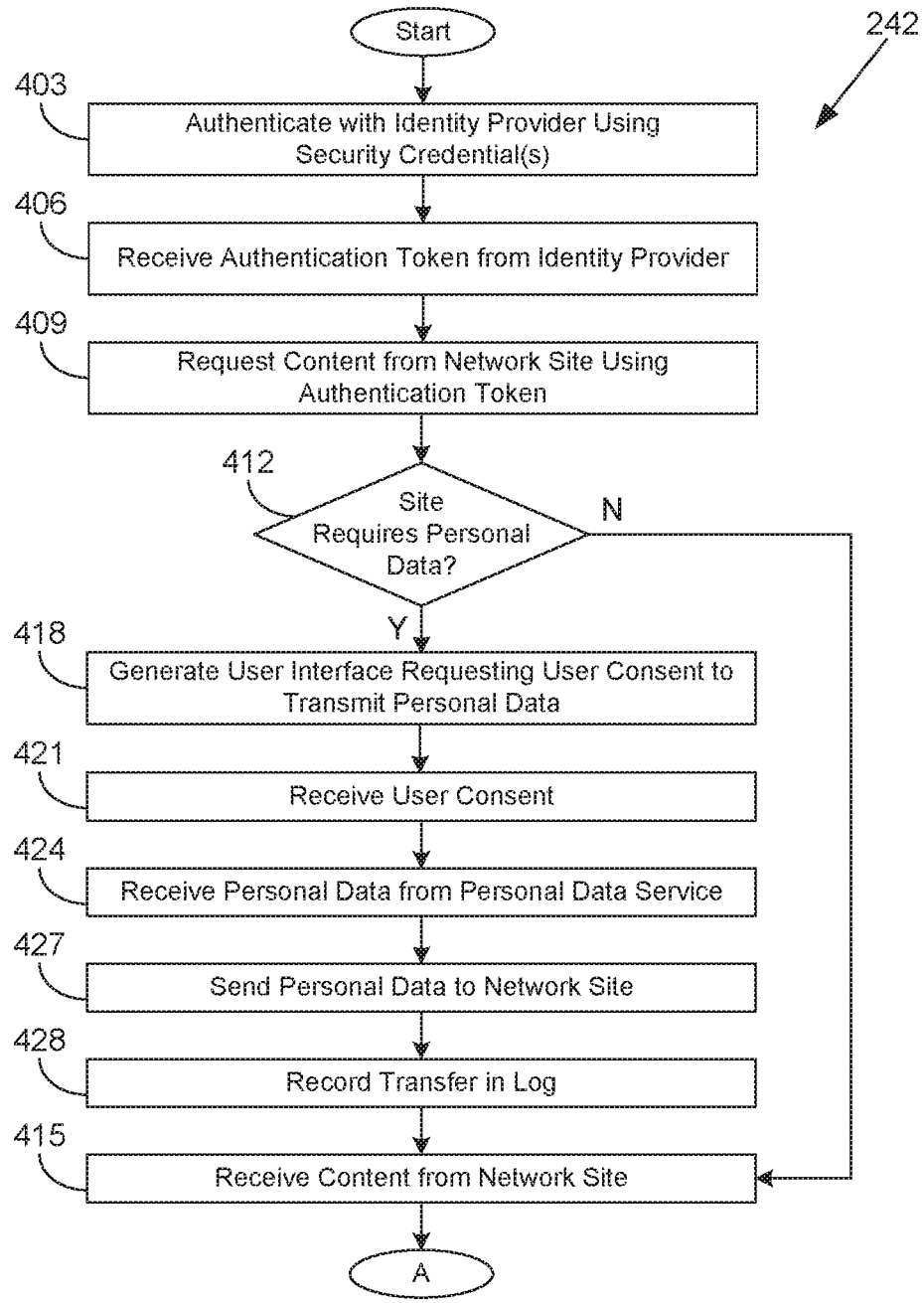
FIGS. 4A and 4B depict a flowchart illustrating one example of functionality implemented as portions of a client application executed in a client device in the networked environment of FIG. 2A or 2B according to various embodiments of the present disclosure.
Figure 4B:
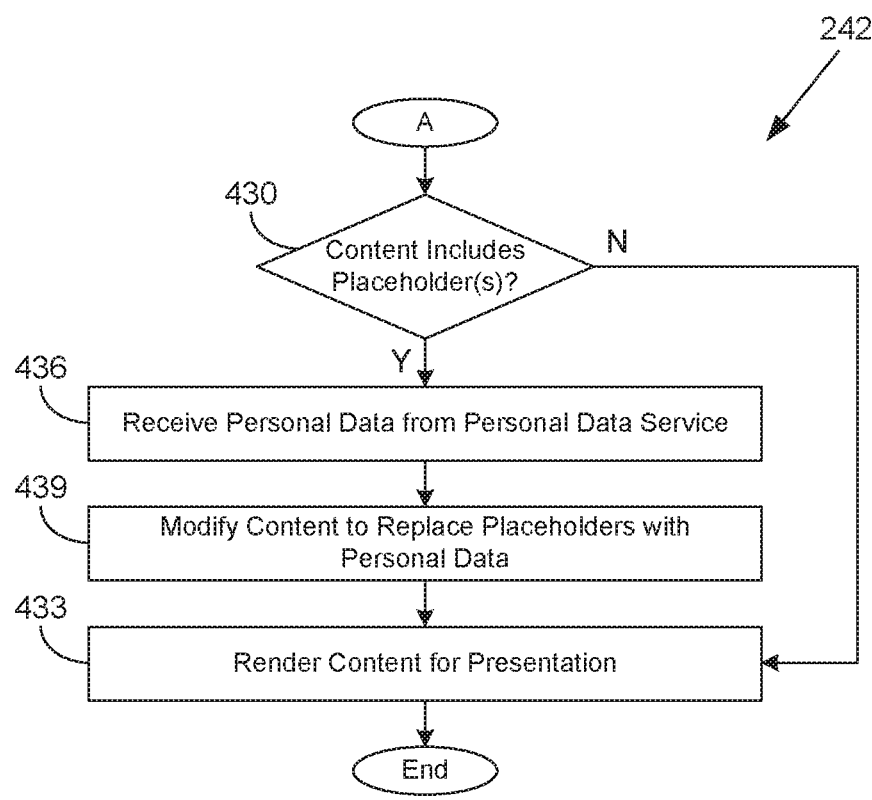

Moving on to FIGS. 4A and 4B, shown is a flowchart that provides one example of the operation of a portion of the client application 242 according to various embodiments. It is understood that the flowchart of FIGS. 4A and 4B provides merely an example of the many different types of functional arrangements that may be employed to implement the operation of the portion of the client application 242 as described herein. As an alternative, the flowchart of FIGS. 4A and 4B may be viewed as depicting an example of elements of a method implemented in the client device 209 (FIG. 2A) according to one or more embodiments.

Beginning with box 403 in FIG. 4A, the client application 242 authenticates with an identity provider 221 (FIG. 2A) using one or more security credentials. The security credentials may be stored in the client device 209 or may be input by a user. As part of the authentication task, the user may be granting access for one or more relying parties (e.g., network sites 230 (FIG. 2A) and/or network pages on the network sites 230) to have access to various personal data 248 (FIG. 2A) stored by the personal data service 243 (FIG. 2A). Upon authentication, the client application 242 receives an authentication token from the identity provider 221 in box 406. The authentication process may employ technologies such as OAuth, OpenID, SAML, and so on.

In box 409, the client application 242 requests content 236 (FIG. 2A) from a third-party network site 230 using the authentication token to confirm authentication with the identity provider 221. Thus, a user need not create a separate account or sign-in separately with the network site 230 so long as the network site 230 supports authentication via the identity provider 221. By not creating a separate account, the user has not supplied personal data 248 to the network site 230, but the network site 230 may still require some types of personal data 248. In some cases, an authentication token provided to the network site 230 by the client application 242 may enable the network site 230 to request personal data 248 from the personal data service 243.

In box 412, the client application 242 determines whether the network site 230 requires personal data 248 to fulfill the request for content 236. In this regard, the network site 230 may return a response to the client application 242 indicating that some forms of personal data 248 are required. For example, the client application 242 may return an HTTP response indicating that credit card information is needed to process a payment. If no personal data 248 is required by the network site 230 at this time, the client application 242 continues to box 415.

If the network site 230 does require one or more items of personal data 248, the client application 242 instead proceeds from box 412 to box 418. In box 418, the client application 242 generates a user interface 245 (FIG. 2A) requesting user consent to transmit the personal data 248 that has been requested to the network site 230. For example, the client application 242 may render a dialog box on a display 239 (FIG. 2A) indicating that the network site 230 is requesting credit card information and giving the option to the user to consent to transferring the information or to decline transferring the information. If the user declines, the client application 242 refuses to provide the personal data 248 to the network site 230, which may result in a failed operation or loss of functionality in the content 236. In one embodiment, consent may be solicited from the user by way of an audio announcement via a networked audio device, whereby the user can respond by voice through an approval or denial.

If the user approves, the user consent or approval is received in box 421. In box 424, the client application 242 receives the personal data 248 or a portion thereof from the personal data service 243, which may be located on the same client device 209 as in FIG. 2A or in a different computing environment 263 as in FIG. 2B. Where the personal data service 243 is not on the same device, the client application 242 may perform a discovery function in order to locate the personal data service 243 (e.g., sending a broadcast message over a local network). In some cases, the requested information may not be available to the personal data service 243. Thus, another user interface 245 may be rendered on the display 239 in order to elicit the requested information as input from the user. When provided by the user, the requested information may be added to the personal data 248 stored by the personal data service 243.

In box 427, the client application 242 sends the personal data 248 that has been requested to the network site 230. In other embodiments, the network site 230 may communicate directly with the personal data service 243 to obtain the personal data 248 upon user consent. In box 428, the client application 242 may record the transfer of the personal data 248 (e.g., which items were transferred, to which network site 230, at what time, etc.) for security and audit purposes. In box 415, the client application 242 receives content 236 from the network site 230.

Referring next to FIG. 4B at box 430, the client application 242 next determines whether the content 236 includes one or more placeholders for personal data 248. In such a case, the content 236 may require the use of personal data 248 for rendering a user interface 245, but the network site 230 does not need access to the actual personal data 248. In such a situation, the client device 209 is capable of rendering the content 236 locally for display using the personal data 248.

If the content 236 does not include placeholders, the client application 242 moves from box 430 to box 433. If the content 236 does include placeholders, the client application 242 transitions to box 436. In box 436, the client application 242 receives the personal data 248 corresponding to the placeholder(s) from a personal data service 243. In one embodiment, the placeholder(s) include an authentication token for authenticating the network site 230 or network page that is requesting the personal data 248.

In some cases, the requested information may not be available to the personal data service 243. Thus, another user interface 245 may be rendered on the display 239 in order to elicit the requested information as input from the user. In other cases, the requested information may not be returned to the client application 242 because the request is not authorized. For example, the network page using the data or the corresponding network site 230 may be unauthorized to receive the data.

In one embodiment, the placeholder is provided to the personal data service 243, which then performs a translation to an item of personal data 248 using a placeholder mapping 250 (FIG. 2A). This translation in some cases may involve transformation processing of the personal data 248 (e.g., changing text to upper case, performing substitution, etc.). In one embodiment, the placeholders may include an encrypted representation of a user identifier in order to aid the personal data service 243 in locating the personal data 248 of the correct user.

In box 439, the client application 242 modifies the content 236 to replace the placeholders with the corresponding personal data 248. Where the content 236 is audible content, the client application 242 may replace a placeholder with an audio stream corresponding to the portion of the personal data 248. In some cases, the client application 242 may perform transformations on the corresponding personal data 248. In one embodiment, the client application 242 may modify an element of a document object model of the content 236 to perform this replacement. For example, the client application 242 may replace a text string in the document object model. In some scenarios, the client application 242 may perform a reverse translation to translate the text strings back to placeholder values upon detection of improper behavior by code relative to the content 236. In box 433, the client application 242 renders the content 236 for presentation to a user by way of a display 239, a sound device, or some other output device. Thereafter, the operation of the portion of the client application 242 ends.

It is noted that functions described as part of the client application 242 above may be performed on behalf of a client application 242 by a proxy server 273 (FIG. 2C) in some embodiments. This can include replacing placeholders with personal data 248 automatically, as well as determining that personal data 248 is required by a network site 230. In such cases, a proxy server 273 receives requests for content 236 from the client application 242 and forwards the requests onto the network site 230. The responses from the network site 230 may be modified as described and rather than being rendered for display locally, may be returned by the proxy server 273 to a client device 209 for rendering on a display 239.

Figure 5:
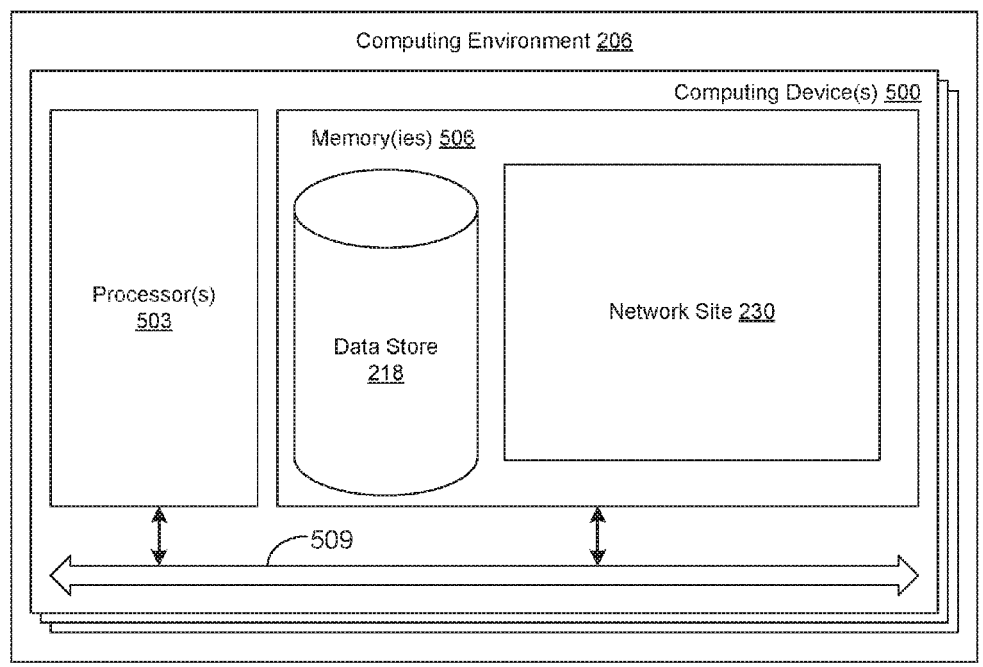
FIG. 5 is a schematic block diagram that provides one example illustration of a computing environment employed in the networked environments of FIGS. 2A-2C according to various embodiments of the present disclosure.

With reference to FIG. 5, shown is a schematic block diagram of the computing environment 206 according to an embodiment of the present disclosure. The computing environment 206 is representative of computing environments 203 (FIG. 2A) and 263 (FIG. 2B), which may be structured similarly. The computing environment 206 includes one or more computing devices 500. Each computing device 500 includes at least one processor circuit, for example, having a processor 503 and a memory 506, both of which are coupled to a local interface 509. To this end, each computing device 500 may comprise, for example, at least one server computer or like device. The local interface 509 may comprise, for example, a data bus with an accompanying address/control bus or other bus structure as can be appreciated.

Stored in the memory 506 are both data and several components that are executable by the processor 503. In particular, stored in the memory 506 and executable by the processor 503 are a network site 230, and potentially other applications. Also stored in the memory 506 may be a data store 218 and other data. In addition, an operating system may be stored in the memory 506 and executable by the processor 503.

It is understood that there may be other applications that are stored in the memory 506 and are executable by the processor 503 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 506 and are executable by the processor 503. In this respect, the term "executable" means a program file that is in a form that can ultimately be run by the processor 503. Examples of executable programs may be, for example, a compiled program that can be translated into machine code in a format that can be loaded into a random access portion of the memory 506 and run by the processor 503, source code that may be expressed in proper format such as object code that is capable of being loaded into a random access portion of the memory 506 and executed by the processor 503, or source code that may be interpreted by another executable program to generate instructions in a random access portion of the memory 506 to be executed by the processor 503, etc. An executable program may be stored in any portion or component of the memory 506 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 506 is defined herein as including both volatile and nonvolatile memory and data storage components. Volatile components are those that do not retain data values upon loss of power. Nonvolatile components are those that retain data upon a loss of power. Thus, the memory 506 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 503 may represent multiple processors 503 and/or multiple processor cores and the memory 506 may represent multiple memories 506 that operate in parallel processing circuits, respectively. In such a case, the local interface 509 may be an appropriate network that facilitates communication between any two of the multiple processors 503, between any processor 503 and any of the memories 506, or between any two of the memories 506, etc. The local interface 509 may comprise additional systems designed to coordinate this communication, including, for example, performing load balancing. The processor 503 may be of electrical or of some other available construction.

Although the network site 230, the identity provider 221 (FIGS. 2A-2C), the client application 242 (FIGS. 2A-2C), the personal data service 243 (FIGS. 2A-2C), the proxy server 273 (FIG. 2C), and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 3-4B show the functionality and operation of an implementation of portions of the personal data service 243 and the client application 242. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 503 in a computer system or other system. The machine code may be converted from the source code, etc. If embodied in hardware, each block may represent a circuit or a number of interconnected circuits to implement the specified logical function(s).

Although the flowcharts of FIGS. 3-4B show a specific order of execution, it is understood that the order of execution may differ from that which is depicted. For example, the order of execution of two or more blocks may be scrambled relative to the order shown. Also, two or more blocks shown in succession in FIGS. 3-4B may be executed concurrently or with partial concurrence. Further, in some embodiments, one or more of the blocks shown in FIGS. 3-4B may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the network site 230, the identity provider 221, the client application 242, the personal data service 243, and the proxy server 273, that comprises software or code can be embodied in any non-transitory computer-readable medium for use by or in connection with an instruction execution system such as, for example, a processor 503 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the network site 230, the identity provider 221, the client application 242, the personal data service 243, and the proxy server 273, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device, or in multiple computing devices in the same computing environment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in a computing device, wherein when executed the program causes the computing device to at least:
   receive a security credential from a user;
   authenticate with a federated identity provider using the security credential;
   responsive to authenticating with the federated identity provider,
   receive an authentication token from the federated identity provider;
   request content from a network site using the authentication token;
   responsive to requesting content, receive the requested content and determine that the requested content includes a placeholder for personal data different from the security credential;
   receive the personal data from a personal data service using the placeholder, wherein the personal data service is distinct from the computing device, the federating identity provider, and the network site, the personal data service is configured to limit access to the personal data to a client the network site authorized by a user who owns the personal data;
   responsive to receiving the personal data, modify the received requested content to replace the placeholder with the personal data; and
   render the received requested content including the personal data in place of the placeholder for presentation to the user via at least one of a display or a sound device coupled to the computing device.

2. The non-transitory computer-readable medium of claim 1, wherein when executed the program further causes the computing device to at least:
   determine that the network site requests additional personal data;
   render a user interface requesting approval from the user to send the additional personal data to the network site;
   receive the approval from the user;
   receive the additional personal data from the personal data service; and
   send the additional personal data to the network site.

3. The non-transitory computer-readable medium of claim 1, wherein when executed the program further causes the computing device to at least:
   determine that the network site requests additional personal data that is not available to the personal data service;
   render a user interface requesting the additional personal data from the user; and
   send the additional personal data to the personal data service.

4. A system, comprising:
   a computing device; and
   at least one application executable in the computing device, wherein when executed the at least one application causes the computing device to at least:
      request content from a network site using an authentication token; responsive to the request, receive the requested content and
      determine that the received requested content includes a placeholder for personal data different from the authentication token;
      receive the personal data from a personal data service using the placeholder, wherein the personal data service is distinct from the computing device and the network site, the personal data service is configured to limit access to the personal data to a client the network site authorized by a user who owns the personal data; responsive to receiving the personal data,
      modify the received requested content to replace the placeholder with the personal data; and
      render the received requested content including the personal data and excluding the placeholder for presentation via at least one of a display or a sound device coupled to the computing device.

5. The system of claim 4, wherein when executed the at least one application further causes the computing device to at least transform the personal data before replacing the placeholder with the personal data.

6. The system of claim 4, wherein when executed the at least one application further causes the computing device to at least:
   authenticate with an identity provider using a security credential; and
   receive the authentication token from the identity provider.

7. The system of claim 4, wherein when executed the at least one application further causes the computing device to at least:
   determine that the network site requests additional personal data;
   render a user interface requesting approval from the user to send the additional personal data to the network site;
   receive the approval from the user;
   receive the additional personal data from the personal data service; and
   send the additional personal data to the network site.

8. The system of claim 7, wherein when executed the at least one application further causes the computing device to at least record in a log that the additional personal data has been sent to the network site.

9. The system of claim 4, wherein the personal data service is configured to limit access to the personal data by denying access to network addresses not on a whitelist of approved network addresses.

10. The system of claim 4, wherein the received requested content corresponds to a network page having a document object model, and modifying the received requested content comprises replacing a text string in an element of the document object model.

11. The system of claim 4, wherein the received requested content corresponds to audio content, and modifying the received requested content comprises inserting an audio stream.

12. The system of claim 4, wherein the at least one application comprises a proxy server, and wherein when executed the at least one application further causes the computing device to at least:
   receive a request for the content from a client computing device via a network; and
   send the modified content to the client computing device.

13. The system of claim 4, wherein the computing device comprises a client computing device, the at least one application comprises a browser executed by the client computing device, and the personal data service is executed by the client computing device.

14. The system of claim 4, wherein the computing device comprises a client computing device, the at least one application comprises a browser executed by the client computing device, and the personal data service is executed by another computing device on a local network with the client computing device.

15. A method, comprising:
   requesting, via a computing device, content from a network site using an authentication token;
   responsive to requesting content:
      receiving, via the computing device, the requested content; and
      determining, via the computing device, that the network site requests access to personal data the requested content includes a placeholder for personal data different from the authentication token;
      rendering, via the computing device, a user interface requesting approval from a user to send the personal data to the network site;
      receiving, via the computing device, the approval from the user;
      receiving, via the computing device, the personal data from a personal data service using the placeholder, wherein the personal data service is distinct from the computing device and the network site, the personal data service is configured to limit access to the personal data to the network site authorized by a user who owns the personal data;
      sending, via the computing device, the personal data to the network site;
      recording, via the computing device, in a log that the personal data has been sent to the network site; responsive to receiving the personal data,
      modifying, via the computing device, the received requested content to replace the placeholder with the personal data; and
      rendering, via the computing device, the received requested content for display on a display coupled to the computing device, wherein the personal data is rendered on the display.

16. The method of claim 15, further comprising:
   authenticating, via the computing device, with a federated identity provider using a security credential; and
   prior to requesting content from the network site using the authentication token, receiving, via the computing device, the authentication token from the federated identity provider.

17. The method of claim 15, further comprising:
   determining, via the computing device, that the personal data service does not have an item of the personal data requested by the network site;
   rendering, via the computing device, another a user interface requesting the item of the personal data from the user; and
   sending, via the computing device, the item of the personal data to the personal data service.

18. The method of claim 15, further comprising:
   determining, via the computing device, that the received requested content includes a placeholder for additional personal data; and
      receiving, via the computing device, the additional personal data from the personal data service, wherein the received requested content is modified by replacing the placeholder with the additional personal data.

19. The method of claim 18, further comprising performing, via the computing device, a localization on the additional personal data.

20. The method of claim 18, further comprising sending, via the computing device, a request to the personal data service for the additional personal data, the request specifying the placeholder.

* * * * *